United States Patent [19]

Kawai

[11] Patent Number: 4,926,903
[45] Date of Patent: May 22, 1990

[54] BUTTERFLY VALVE HAVING A FUNCTION FOR MEASURING A FLOW RATE AND METHOD OF MEASURING A FLOW RATE WITH A BUTTERFLY VALVE

[75] Inventor: Kouzi Kawai, Higashi-Osaka, Japan

[73] Assignee: Tomoe Technical Research Company, Japan

[21] Appl. No.: 347,621

[22] Filed: May 5, 1989

[51] Int. Cl.$^5$ .......................... G01F 1/28; F16K 37/00
[52] U.S. Cl. .................................. 137/554; 137/486; 251/129.04; 73/861.75
[58] Field of Search ...................... 137/486, 554; 251/129.04; 73/861.53, 861.71, 861.74, 861.75, 861.76

[56] References Cited

U.S. PATENT DOCUMENTS

| | | | |
|---|---|---|---|
| 1,877,810 | 9/1932 | Chamberlain | 137/486 |
| 2,501,583 | 3/1950 | Schafer | 251/129.04 X |
| 2,662,547 | 12/1953 | Comeau | 137/486 X |
| 2,723,615 | 11/1955 | Morris et al. | 137/486 X |
| 3,225,785 | 12/1965 | Goike | 137/486 |
| 3,240,062 | 3/1966 | Fredriksson | 73/861.75 |
| 3,331,388 | 7/1967 | Evans et al. | 73/861.74 X |
| 3,776,249 | 12/1973 | Wailes et al. | 137/486 X |
| 4,112,885 | 9/1978 | Iwata et al. | 251/129.04 X |
| 4,157,661 | 6/1979 | Schindel | 73/861.73 |
| 4,428,242 | 1/1984 | Holstrom | 73/861.75 |

FOREIGN PATENT DOCUMENTS

| | | | |
|---|---|---|---|
| 2614811 | 10/1977 | Fed. Rep. of Germany | 73/861.75 |
| 55-142169 | 11/1980 | Japan. | |
| 56-28355 | 3/1981 | Japan. | |
| 62-1117 | 1/1987 | Japan. | |
| 62-270873 | 11/1987 | Japan. | |
| 63-120973 | 5/1988 | Japan. | |
| 257781 | 1/1971 | U.S.S.R. | 73/861.74 |
| 631973 | 11/1949 | United Kingdom | 73/861.74 |
| 919593 | 2/1963 | United Kingdom | 73/861.75 |

OTHER PUBLICATIONS

"Study on Hydrodynamic Characteristics of a Butterfly Valve" (a doctoral theses), Kazuhiko Ogawa, Jan. 1986, Kobe Univ., Japan.
ISA Handbook of Control Valves, 2nd Edition, pp. 123 and 124 published in Pennsylvania, USA (Date Unknown).

Primary Examiner—John Rivell
Attorney, Agent, or Firm—Nixon & Vanderhye

[57] ABSTRACT

A butterfly valve having a function for measuring a flow rate of a fluid flowing through the butterfly valve includes a main body, a valve shaft fixed rotatably to the main body, a valve member fixed to the valve shaft and mounted rotatably in the main body, a valve opening detection device for detecting a valve opening of the butterfly valve, and a torque detection device for detecting a dynamic torque applied to the valve member around the valve shaft by the fluid.

16 Claims, 8 Drawing Sheets

BUTTERFLY VALVE HAVING A FUNCTION FOR MEASURING A FLOW RATE AND METHOD OF MEASURING A FLOW RATE WITH A BUTTERFLY VALVE

BACKGROUND OF THE INVENTION

The present invention relates to a butterfly valve and, more particularly, to a butterfly valve having a function for measuring a flow rate of a fluid flowing through the butterfly valve. The invention is also concerned with a method of measuring a flow rate with a butterfly valve, as well as a method of controlling a flow rate with a butterfly valve.

In general, a butterfly valve has a valve member which is rotatably mounted in a main body and fixed to a valve shaft which is fixed rotatably to the main body. The valve shaft is operated from outside of the main body manually or by means of a pneumatic or electric actuator so as to rotate the valve member, thus changing the valve opening.

The flow rate of a fluid flowing through such a butterfly valve can be controlled by measuring the flow rate by a measuring means and changing the valve opening based on the measured flow rate.

Such a measurement of the flow rate is conducted by, for example, a flowmeter which is independent from the butterfly valve and installed in the vicinity of the butterfly valve. In this case, the flow rate measured by this flowmeter is regarded as the flow rate of the fluid flowing through the butterfly valve.

A typical flowmeter used for this purpose is a differential pressure type flowmeter comprises an orifice provided in the pipe in which the butterfly valve is installed, and a pressure sensor capable of detecting the differential pressure across the orifice, i.e., between the upstream and downstream sides of the orifice. The flow rate is determined from the detected differential pressure $\Delta P$ and a capacity coefficient (Cv value) which is a constant value peculiar to the orifice and determined beforehand through, for example, an experiment.

As a modification of such a differential pressure type flowmeter composed of an orifice and a pressure sensor, in order to attain a compact construction of the system, there is a combination system which makes use of the butterfly valve itself as such an orifice. Namely, such a combination system comprises a pressure sensor capable of detecting the differential pressure of the fluid across the butterfly valve and means for detecting the valve opening of the butterfly valve. A capacity coefficient (Cv value) as function of the valve opening peculiar to this butterfly valve is beforehand determined through, for example, an experiment. Thus, the flow rate is determined from the detected differential pressure $\Delta P$ and the value of the capacity coefficient Cv corresponding to the detected valve opening. This combination system is proposed in Japanese Patent Unexamined Publication No. 62-270873 of the same applicant.

Another combination system similar to the above-mentioned combination system of a butterfly valve and a pressure sensor is disclosed in Japanese Utility Model Unexamined Publication No. 62-1117, which is designed to measure the flow rate of a fluid flowing through a gate valve used also as such an orifice. Thus, this combination system comprises a pressure sensor capable of detecting the differential pressure across the gate valve, and means for detecting the valve lift of the gate valve. A capacity coefficient (Cv value) as a function of the valve lift peculiar to this gate valve is beforehand determined through, for example, an experiment. Thus, the flow rate is determined by the detected differential pressure $\Delta P$ and the value of the capacity coefficient Cv corresponding to the detected valve lift.

Flowmeters of types other than the above mentioned differential pressure type also have been used. For instance, a system has been known in which the valve opening of a butterfly valve disposed in a line of a conductive fluid is controlled in accordance with the flow rate of the fluid measured by an electromagnetic flowmeter disposed independently in the vicinity of the butterfly valve.

In general, it has been regarded that the torque required for rotating the valve member and for fixing the same with a desired valve opening is preferably small, because the smaller torque requires a smaller external driving torque and, hence, a smaller actuator. The smaller torque is preferred also from the view point of maneuverability.

From this point of view, intense study and development have been made for the purpose of reducing the dynamic torque applied to the valve member around the valve shaft by the fluid flowing through the butterfly valve. For instance, the same applicant has proposed, in Japanese Patent Unexamined Publication Nos. 55-142169 and 56-28355, butterfly valves equipped with seat rings capable of reducing the external driving torque.

Known butterfly valves, including those described hereinbefore, function only as a restriction in which the valve member restricts the flow of the fluid.

Thus, in order to enable a butterfly valve to regulate or control the flow rate, it is necessary to install suitable means for measuring the flow rate in the path of the flow of the fluid in addition to the valve member. A butterfly valve system including such means for measuring the flow rate therefore complicates the construction of the flow passage, failing to meet the demand for a compact design.

It is also to be pointed out that quantitative and time deviations tend to exist between the flow rate measured by the flowmeter and the actual flow rate through the butterfly valve, due to the fact that the flow rate is measured indirectly or at a position which is spaced from the butterfly valve. This makes it difficult to measure and, hence, to control the flow rate accurately.

SUMMARY OF THE INVENTION

Accordingly, the present invention aims at providing a butterfly valve which has, in addition to the function as a restriction, a function of measuring the flow rate.

More specifically, a first object of the present invention is to provide a butterfly valve in which the valve member and the valve shaft function as a sensor for measuring the flow rate.

A second object of the present invention is to provide a method of measuring flow rate of a fluid flowing through a butterfly valve, wherein the valve member and the valve shaft of the butterfly valve function as a sensor.

The first object of the present invention can be achieved by a butterfly valve having a function for measuring a flow rate of a fluid flowing through said butterfly valve, comprising;
a main body,
a valve shaft fixed rotatably to said main body, a valve member fixed to said valve shaft and mounted rotatably in said main body, a valve opening detection means for detecting a valve opening of said butterfly valve, and a torque detection means for detecting a dynamic torque applied to said valve member around said valve shaft by said fluid.

The second object of the present invention can be achieved by a method of measuring a flow rate of a fluid flowing through a butterfly valve, comprising the steps of;

detecting a valve opening of said butterfly valve, detecting a dynamic torque applied to said valve member around said valve shaft by said fluid, and determining said flow rate as a function of said detected valve opening and said detected dynamic torque.

According to an experiment conducted by the present inventor, it is shown that the flow rate of a fluid flowing through a butterfly valve can be substantially definitely determined by the valve opening, the dynamic torque applied to the valve member around the valve shaft by the fluid and a characteristic peculiar to each butterfly valve, provided that the measurement is conducted on the same fluid under the same condition.

Consequently, in the butterfly valve of the present invention, since the valve opening is detected by the valve opening detection means, and since the dynamic torque applied to the valve member around the valve shaft by the fluid is detected by the torque detection means, once the relationship of the flow rate to the valve opening and the dynamic torque peculiar to each butterfly valve is beforehand obtained, it is possible to determine the flow rate from the detected valve opening and the detected dynamic torque.

In general, the flow rate of a fluid flowing through a butterfly valve is ruled by the differential pressure across the butterfly valve, i.e., between the upstream and downstream sides of the butterfly valve, and the characteristic which is peculiar to the butterfly valve, provided that the type of the fluid and the flowing conditions are unchanged. Thus, the flow rate Q can be expressed as the following formula (1) as a function F of variants $\theta$ (valve opening) and $\Delta P$ (differential pressure).

$$Q = F(\theta, \Delta P) \qquad (1)$$

The function F is determined in accordance with factors such as the diameter of the valve member, configuration of the valve member and so forth. It will be naturally understood that the value of the function F increases as one or both of the valve opening $\theta$ and the differential pressure $\Delta P$ increase. Therefore, once the function F peculiar to each butterfly valve is determined through an experiment or through a theoretical analysis, the flow rate Q can be definitely determined for each butterfly valve by measuring the valve opening $\theta$ and the differential pressure $\Delta P$ and substituting the measured values to the predetermined function F.

The attention of the present inventor is drawn to the fact that the dynamic torque applied to the valve member around the valve shaft by the fluid varies in accordance with the change in the flow rate. A discussion will be therefore given as to a function G of the following formula (2) which employs the valve opening $\theta$ and the dynamic torque T as the variances, as an alternative or a substitution for the aforementioned function F.

$$Q = G(\theta, T) \qquad (2)$$

In order to evaluate this function, the present inventor conducts an experiment having the following steps (i) to (vii).

(i) To apply a desired differential pressure $\Delta P$ to the butterfly valve.

(ii) To measure the opening $\theta$, the torque T and the flow rate Q f the fluid flowing through the butterfly valve.

(iii) To measure and record changes in the torque T and the flow rate Q caused by a change in the differential pressure $\Delta P$ with the opening $\theta$ being fixed.

(iv) To conduct the same measurement and record as (iii) by varying the opening $\theta$ by a suitable angle $\Delta\theta$.

(v) To repeatedly execute measurement and record of the steps (iii) and (iv) while varying the opening $\theta$ from 0° to 90° at an interval of $\Delta\theta$.

(vi) To execute, as necessitated, steps (i) to (v) for various kinds of fluids.

(vii) To execute steps (i) to (vi) for a plurality of butterfly valves.

It can be known from the result of the experiment consisting of the steps (i) to (vii) that the function G practically comes into existence. Accordingly, the function G as the characteristic peculiar to each butterfly valve can be determined in the form of an experimental formula, by filling lack of data through a suitable interpolation method or by employing a suitable approximation expression.

Consequently, by using this peculiar function G, it is possible to definitely determine the flow rate Q of a fluid flowing through the butterfly valve, by measuring the valve opening $\theta$ and the dynamic torque T, without requiring measurement of the differential pressure $\Delta P$.

A theoretical explanation will be given as to the existence of the function G and the practical determination of the function G.

In general, it is known about the butterfly valve that a functional relationship exists between the valve opening $\theta$ and the Cv value (capacity coefficient of the butterfly valve) which is a function of variances Q (flow rate) and $\Delta P$ (differential pressure).

There also exists a functional relationship between the valve opening $\theta$ and the Cu value (practical torque coefficient) which is a function of variances T (dynamic torque) and $\Delta P$ (differential pressure).

Thus, the Cv value and the Cu value are respectively expressed by a function f of variants Q and $\Delta P$, and a function g of vaiants T and $\Delta P$ as shown in the following formulae (3) and (4).

$$Cv = f(Q, \Delta P) \qquad (3)$$

$$Cu = g(T, \Delta P) \qquad (4)$$

Assuming that the conditions as shown in the following formulae (5) and (6), in which the Cv value and the Cu value are respectively expressed by a function ff of variant $\theta$ and a function gg of variant $\theta$, are met, $$Cv = ff(\theta) \qquad (5)$$

$$Cu = g g(\theta) \qquad (6)$$

the following formula (7), in which the flow rate Q is expressed by a function f' of variants Cv and $\Delta P$, is derived from the formulae (3) and (5), $$Q=f(C_v, \Delta P)=f(ff(\theta), \Delta P) \quad (7)$$

and the following formula (8), in which the pressure $\Delta P$ is expressed by a function $g'$ of variants $Cu$ and $T$, is derived from the formulae (4) and (6).

$$\Delta P = g'(Cu, T) = g'(gg(\theta), T) \quad (8)$$

Then, the following formula (9), in which the flow rate Q is expressed by a function K of variants T and $\theta$, is derived from the formulae (7) and (8).

$$Q=h(ff(\theta), g'(gg(\theta), T))=K(T,\theta) \quad (9)$$

Whereby, it can be seen that the formula (9) thus obtained is equivalent to the formula (2): namely, the function K and the function G are identical. Thus, the experiment conducted by the present inventor is materially equivalent to the confirmation of a fact that the assumptions of the formulae (5) and (6) are practically correct and to the determination of the functions $ff(\theta)$ and $gg(\theta)$ in the formulae (5) and (6).

Preferably, the butterfly valve of the present invention has an actuator for rotating the valve member. Such an actuator will enable the valve member to be rotated and fixed with a torque which is much greater than that exerted by a manual labor.

It is also preferred that the butterfly valve of the present invention has a flow rate computation means for computing the flow rate of a fluid as a predetermined function of the valve opening and the dynamic torque. Such a flow rate computation means can automatically output the computed flow rate.

More preferably, the butterfly valve of the present invention has both the actuator and the flow rate computation means. In such a case, it is preferred that the butterfly valve also has a control means at which a desired flow rate can be externally set and which instructs the actuator to rotate the valve member such that the computed flow rate approaches the desired flow rate. In such a case, the flow rate can be controlled without delay through a feedback of the measured data. Preferably, the control means is adapted such that the desired flow rate can be set to the control means from a remote place by a remote operation means through a suitable tele-communication means.

The actuator used in the butterfly valve of the present invention is preferably an electric actuator, a pneumatic actuator, a diaphragm-type actuator or a solenoid-type actuator.

The torque detection means used in the butterfly valve of the present invention preferably includes a strain detector provided to the valve shaft, and more preferably such a strain detector comprises a strain gauge attached on the valve shaft.

It is also preferred that the valve opening detection means used in the butterfly valve of the present invention includes an angle sensor connected to the valve shaft. In such a case, the angle sensor preferably comprises a potentiometer or a rotary encoder.

The butterfly valve of the present invention can be designed either as a so-called central-type valve in which the valve member is fixed to the valve shaft at a central axis of the valve member, or so-called an eccentric-type valve in which the valve member is fixed to the valve shaft at an eccentric axis of the valve member.

The function of the valve opening and the dynamic torque used in the method of the present invention is preferably estimated through an experiment. In such a case, the function can be estimated for any type of butterfly valves.

The estimation of the function through the experiment may be based on an assumption that a linear proportional relationship exists between the dynamic torque and the flow rate when the valve opening is fixed. In such a case, the experiment and the estimation can be simplified.

The method of the invention for determining the flow rate may employ a chart which shows the flow rate values in relation to the valve opening and the dynamic torque. Such a chart is preferably obtained through an experiment.

The determination of the flow rate in the measuring method of the present invention can be performed rapidly and easily when a suitable computer is used.

It is also preferred that the butterfly valve is controlled such that the flow rate determined by the measuring method of the present invention approaches the desired flow rate which can be externally set. In such a case, a rapid control of the flow rate can be realized through a feedback of the measured data.

DESCRIPTION OF THE PREFERRED
EMBODIMENTS

A preferred embodiment of the present invention will be described with reference to the accompanying drawings.

Figure 1:
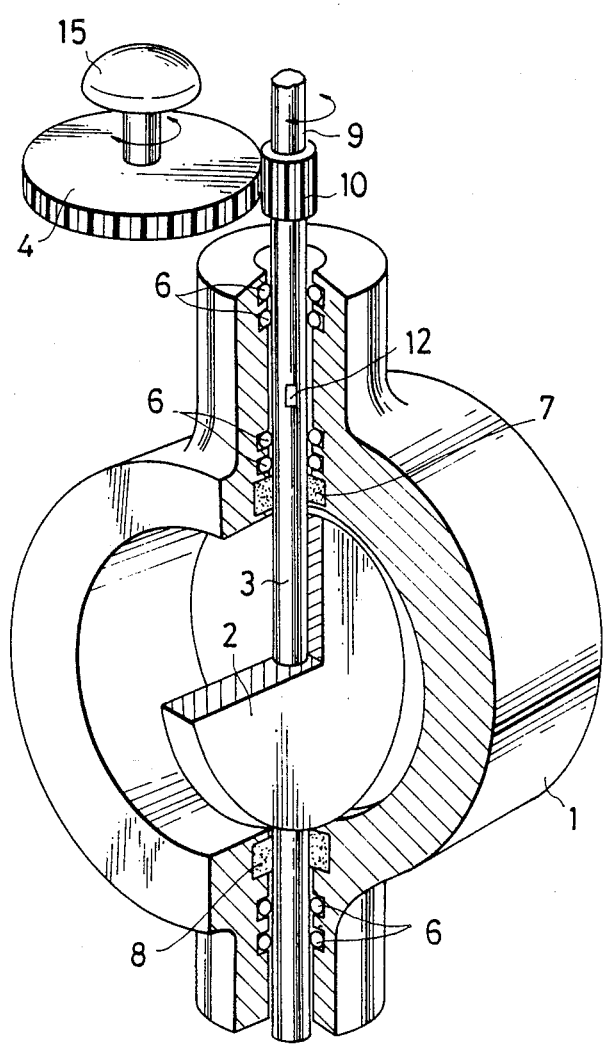
FIG. 1 is a partly-sectioned perspective view of a portion of an embodiment of the butterfly valve according to the present invention.
Figure 1A:
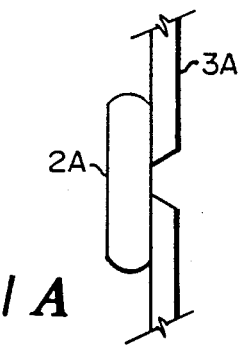
FIG. 1A is a schematic view of an eccentric-type valve member in accordance with another embodiment of the invention.

Referring to FIG. 1 illustrating an embodiment of the butterfly valve in accordance with the present invention, the butterfly valve has a main body 1 and a valve member 2 having an outside diameter slightly smaller than the inside diameter of the main body 1. The valve member 2 is rotatably supported in the main body 1 by means of a valve shaft 3. In the illustrated embodiment, the arrangement of the valve member 2 to the valve shaft 3 is so-called central-type in which the valve member 2 is fixed to the valve shaft 3 at the central axis of the valve member 2. This, however, is only illustrative and the arrangement may be so-called eccentric type in which the valve member 2A is fixed to the valve shaft 3A at the eccentric axis of the valve member 2 as shown in FIG. 1A. The valve shaft 3 extends through a shaft bore formed in the main body 1. A gland packing 7 and a seal ring 8 are disposed between the valve shaft 3 and the wall of the shaft bore, in order to provide a seal therebetween while allowing the valve shaft 3 to rotate with respect to the main body 1. A smooth rotation of the valve shaft 3 is ensured by a shaft bearing 6.

Figure 2:
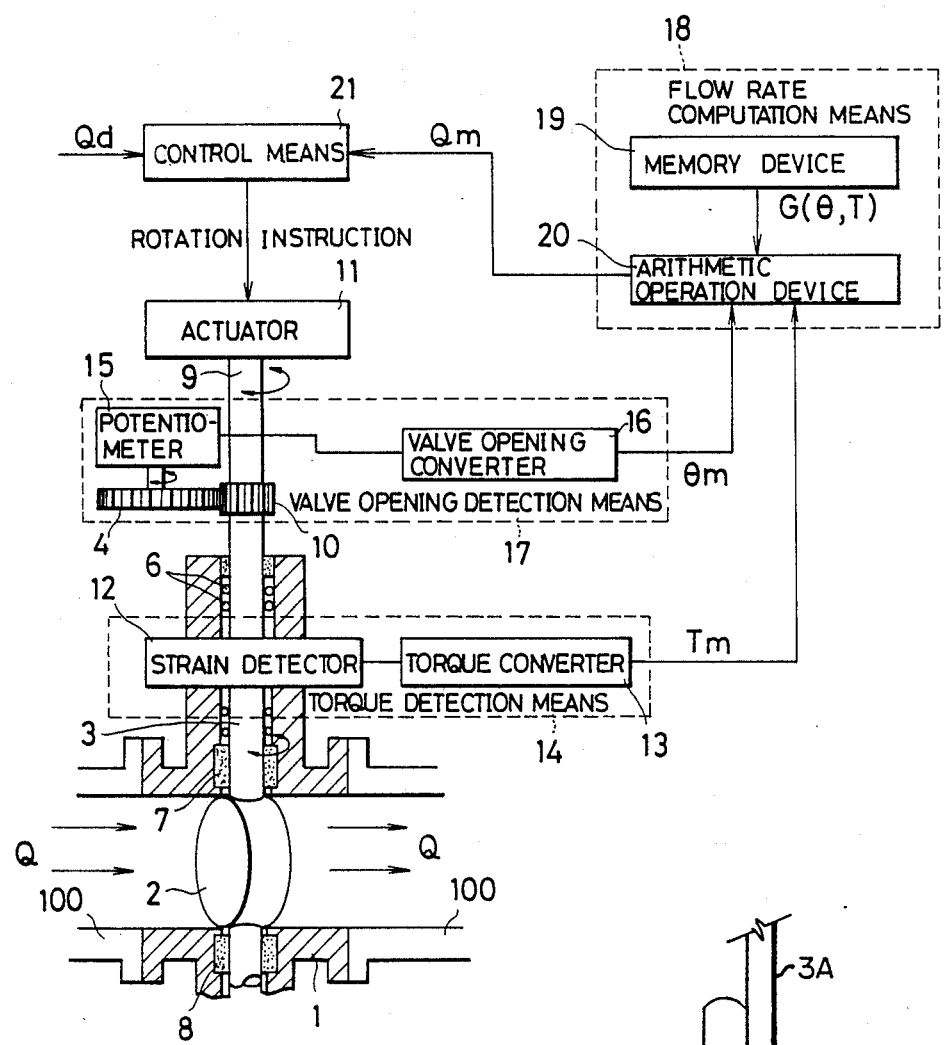
FIG. 2 is a schematic diagram of an embodiment of the present invention.

The main body 1 of this butterfly valve is connected to a pipe 100 in a manner known per se as shown in FIG. 2. The pipe 100 is usually made of a metal or a plastic and the diameter of the pipe 100 generally ranges between several millimeters and several meters. Preferably, the diameter of the pipe 100 ranges between more than 10 millimeters and several meters, more preferably between several tens of millimeters and several meters. Usually, a plurality of classes of butterfly valve having different sizes of the main body 1 are manufactured and the size of the main body 1 of which conforms with the pipe diameter is used. In general, a greater inside diameter of the pipe 100, the main body 1 and thus valve member 2, a greater dynamic torque as a signal is applied to the valve member 2 around the valve shaft 3 by the fluid. Therefore, the precision of the flow rate measurement is increased more easily when the inside diameters of the pipe 100 and the main body 1 are greater. Conversely, the dynamic torque as the signal becomes smaller as the size of the main body 1, i.e., the size of the valve member 2, becomes smaller, thus, in order to enhance the precision of the measurement, therefore, it is preferred to reduce the levels of noises such as electric noises. A higher degree of conformity between the inside diameter of the pipe 100 and the inside diameter of the main body 1 reduces any turbulency of flow of the fluid which is generated at the juncture between the pipe 100 and the main body 1. In such a case, the state of the flow of fluid coming into the main body 1 more closely approximates the state of laminar flow. This feature is advantageous particularly in the measurement of large flow rates.

In the illustrated embodiment, since the outside diameter of the valve member 2 is slightly smaller than the inside diameter of the main body 1, the flow passage is not completely shut off even when the valve opening is 0°. The butterfly valve of the invention, however, may have a seat ring or an "O" ring made of rubber, Teflon [Trade name] or metal etc. on the inner peripheral surface of the main body 1 so as to be contacted by the peripheral edge of the valve member 2 thereby to completely shut off the flow of the fluid when the valve opening is 0°. The arrangement also may be such that another butterfly valve or another kind of valve which can completely close the flow passage is disposed in the pipe 100 in series to the butterfly valve of the present invention.

An actuator 11 shown in FIG. 2 is operatively connected to one end 9 of the valve shaft 3 in a manner known per se. The actuator 11 is capable of rotating the valve shaft 3 so as to cause the valve member 2 to rotate about the axis of the valve shaft 3. The actuator 11 is also capable of fixing the valve shaft 3 and, hence, the valve member 2 at a predetermined angle, thus determining the valve opening of the butterfly valve. Various types of actuators such as an electric actuator, a pneumatic actuator, a diaphragm actuator and a solenoid-type actuator can be used as the actuator 11. The use of the actuator 11 is not essential. Namely, the butterfly valve of the invention may be constructed such that the valve shaft 3 is rotated manually.

A strain detector 12 capable of detecting a minute twist of the valve shaft 3 is provided on the valve shaft 3. A known strain gauge is preferably used as the strain detector 12. The amount of twist detected by the strain detector 12 is delivered to a torque converter 13 which converts the detected amount of the twist into the dynamic torque which acts on the valve member 2 tending to rotate the valve member 2 about the axis of the valve shaft 3, and outputs the thus determined value of dynamic torque.

The strain detector 12 and the torque converter 13 in combination provide a torque detection means 14. Various other torque detectors can be used as the means for detecting the dynamic torque applied to the valve member 2 around the valve shaft 3 by the fluid. It is therefore possible to use an optimum dynamic torque detector taking into account both the measurement precision and the cost.

In order to prevent the bending strain generated in the valve shaft 3 from being included in the signal obtained from the stain detector 12 which is intended for detecting the twist of the valve shaft 3, there are two shaft bearings 6 on each side of the strain detector 12 so as to prevent the bending strain from being transmitted to the strain detector 12. It is preferred that the position of the strain detector 12 on the valve shaft 3 is determined such that the dynamic torque applied to the valve member 2 is more directly transmitted to the strain detector 12. From this point of view, the strain detector 12 is disposed on a portion of the valve shaft 3 which is comparatively close to the valve member 2 across the shaft bearings 6 and the gland packing 7. Such an arrangement enhances the precision of detection of the dynamic torque applied to the valve member 2.

The rotation of the valve shaft 3 is transmitted to a potentiometer 15 as an angle sensor, through a gear 10 formed on the outer peripheral surface of the valve shaft 3 and a gear 4 meshing with the gear 10. Thus, the potentiometer 15 is capable of delivering a signal indicative of the amount of rotation of the valve shaft 3 to a valve opening converter 16 which converts this signal into the degree of the valve opening of the butterfly valve.

In this embodiment, the gear ratio between the gear 4 and the gear 10 is so selected that the angle of rotation of the valve shaft 3 is amplified by the factor of two, thus enabling a higher precision of detection of the valve opening.

Thus, the gear 10, gear 4, potentiometer 15 and the valve opening converter 16 in combination provide a valve opening detection means 17. The potentiometer 15 may be incorporated in the actuator 11. It is also possible to arrange such that the rotation of the valve shaft 3 is transmitted to a separate potentiometer 15 through other gears incorporated in the actuator 11.

The use of the potentiometer 15 is not exclusive. For instance, the valve opening detection means 17 may have a rotary encoder which is connected to the gear 4 or 10 and which is capable of directly or indirectly measuring the rotation angle of the valve shaft 3 in terms of the number of the teeth of the gear 4 or 10. The valve opening detection means 17 may be installed on a portion of the valve shaft 3 which is on the opposite side of the valve member 2 with respect to the torque detection means 14. The described constructions of the valve opening detection means 17 is only illustrative and various other known arrangements are usable as the valve opening detection means 17. The construction of the butterfly valve of the present invention is shown in the form of a schematic diagram in FIG. 2.

According to the present invention, it is possible to determine the flow rate of a fluid flowing through the butterfly valve from the dynamic torque Tm output from the torque detection means 14 and the valve opening $\theta m$ output from the valve opening detection means 17.

The simplest way of determination is to substitute the torque Tm and the opening $\theta m$ to the formula (2) which expresses the flow rate Q as a function G of the dynamic torque T and the valve opening $\theta$ which is peculiar to each butterfly valve and which can be determined beforehand.

$$Q = G(\theta, T) \quad (2)$$

This operation can be done without difficulty by means of, for example, a desk-top calculator, so that the flow rate Qm can be definitely determined in accordance with the measured values of the torque Tm and the opening $\theta m$. Alternatively, a chart showing the values of the flow rate Q in relation to the torque T and the opening $\theta$ is prepared beforehand, so that the flow rate Qm is located on this chart in accordance with the measured values of the torque Tm and the opening $\theta m$. It is thus possible to achieve the first object of the invention by the combination of the torque detection means 14 and the valve opening detection means 17.

In this embodiment, the torque Tm derived from the torque detection means 14 and the opening $\theta m$ derived from the valve opening detection means 17 are input to the flowrate computation means 18. The flow rate computation means 18 includes a memory device 19 which is capable of storing the aforementioned function G of the formula (2) which is peculiar to each butterfly valve and which can be determined beforehand. The flow rate computation means 18 also includes an arithmetic operation device 20 which computes the value of the function G of the formula (2) using the measured values of the torque Tm and the opening $\theta m$. Thus, the flow rate computation means 18 computes and outputs the flow rate Qm upon receipt of the measured values of the torque Tm and the opening $\theta m$. It is possible to add a correction to the result of the computation by use of the formula (2) for the purpose of compensation for any deviation attributable to a change in temperature or changes in the factors such as the viscosity and the specific gravity of the fluid. Such a correction can be executed without difficulty by storing necessary correction data in the memory device 19. The factors such as the temperature t, viscosity $\xi$ and the specific gravity gr may be input to the flow rate computation means 18 as externally settable parameters. It is also possible to arrange such that these factors are automatically input to the flow rate computation means 18 from a thermometer, a viscometer and a gravimeter which are suitably disposed in the flow passage near the butterfly valve. The factors such as the temperature t, viscosity $\xi$ and the specific gravity gr may be employed as variances of a function G', rather than the parameters for correction. In such a case, it is necessary to determine the function G' as shown by the following formula (10).

$$Q = G'(T, \theta, t, \xi, Gr) \quad (10)$$

Determination of the function G' through an experiment is possible although a greater number of steps is required for the experiment as compared with the case of determination of the function G.

By storing this function G' in the flow rate computation means 18, it is possible to obtain a butterfly valve having a function for measuring the flow rate under a variety of conditions. Thus, the butterfly valve of this embodiment can be applied to a variety of types of liquids such as water, alcohol, lubrication oil, fuel oil, petroleum and so forth. The butterfly valve also is applicable to various gases such air, combustion gas, fuel gas, steam and so forth, provided that the precision of the torque detection means is enhanced.

In the illustrated embodiment, the flow rate Qm output from the flow rate computation means 18 is input to the control means 21 in which a desired flow rate Qd is set externally. The external setting of the flow rate Qd may be conducted by a known remote operation means through a suitable tele-communication device or may be done at the site of the butterfly valve. The control means 21 operates to compute the difference between the flow rate Qm and the flow rate Qd and delivers an instruction to the actuator 11 so as to cause the actuator 11 to rotate the valve member 2 in such a direction as to reduce the difference.

A description will be given of the operation of this embodiment. The butterfly valve is disposed in a portion of the pipe 100 through which a fluid to be controlled flows. The fluid such as water, oil or the like flows through the pipe 100 at a flow rate which is determined by the differential pressure of the fluid across the butterfly valve and the degree of the valve opening of the butterfly valve.

In this embodiment, the valve opening is variable between 0° and 90°. The valve opening of 0° means that the valve member has been rotated to the position of the minimum opening so that the fluid is allowed to flow only through a minute gap left between the valve member 2 and the main body 1. Conversely, the valve opening of 90° means the state in which the valve is fully opened so that the differential pressure of the fluid across the butterfly valve is minimized. It is assumed here that the fluid is flowing through the butterfly valve which is set at a desired valve opening. The valve opening detection means 17 detects the valve opening and delivers the same as the opening $\theta m$. Meanwhile, the torque detection means 14 detects the dynamic torque which is produced by the fluid and which acts on the valve member 2 so as to tend to rotate the valve member 2 about the axis of the valve shaft 3 and delivers the thus detected torque as the torque Tm. Upon receipt of the opening $\theta m$ and the torque Tm, the flow rate computation means 18 executes the computation of the function G of the formula (2) or the function G' of the formula (10) so as to determine the flow rate Qm corresponding to the opening $\theta m$ and the torque Tm, and delivers this flow rate Qm to the control means 21. Upon receipt of the flow rate Qm, the control means 21 operates to determine any difference between the flow rate Qm and the desired flow rate Qd which is externally set and, if there is any difference, delivers an instruction to the actuator 11 so as to enable the actuator 11 to actuate the valve shaft 3 in such a direction as to reduce the difference. Thus, the instruction given by the control means 21 to the actuator 11 is sorted into the following three types:

(a) Instruction for increasing the valve opening is given when the condition of Qd>Qm is met.

(b) Instruction for reducing the valve opening is given when the condition of Qd<Qm is met.

(c) No instruction is given when the condition of Qd=Qm is met.

Thus, the described embodiment employs a closed feedback loop which enables the actuator 11 to operate in such a manner as to cause the measured flow rate Qm to infinitely approach the desired flow rate Qd.

The instruction delivered by the control means 21 to the actuator 11 is ceased when the measured value of the flow rate Qm has become equal to the flow rate Qd as a result of operation of the actuator 11, so that the actuator 11 stops to operate so as to fix the valve member 2, thereby allowing the instant flow rate Qm to be maintained. Any change in the pressure at the upstream side and/or the downstream side of the butterfly valve causes the flow rate Qm to be changed, even after the coincidence between the measured flow rate Qm and the flow rate Qd has been achieved. However, the above-mentioned closed feedback loop enables the valve opening to be varied without delay to recover the flow rate Qm coinciding with the flow rate Qd.

As will be understood from the foregoing description, in the illustrated embodiment, the valve member 2 itself functions both as a sensor for producing a flow rate information and a restriction member which restricts the flow of the fluid in accordance with the thus obtained flow rate information. Thus, the measurement of the flow rate can be conducted directly and at a high degree of precision without suffering from any error which may otherwise be caused by spacing between the sensor and the butterfly valve and by a delay of time.

A description will be given hereinunder of the manner of setting of the function G used in this embodiment. The function F appearing in the formula (1) is well known and the following formula (11) is used as a practical form of the function F.

$$Q = F(\theta, \Delta P) = \alpha Cv \sqrt{\Delta P} \quad (11)$$

where, $$Cv = ff(\theta) \quad (5)$$

In the formula (11), $\alpha$ represents a correction coefficient employed for the purpose of compensation for a change in the result of measurement caused by a change in factors such as specific gravity, viscosity and temperature of the fluid. Thus, the flow rate Q is in proportion to the root of the differential pressure $\Delta P$, if the opening $\theta$ is fixed, and the proportion constant is $\alpha \times Cv$, as can be seen from the formula (11).

Figure 3:
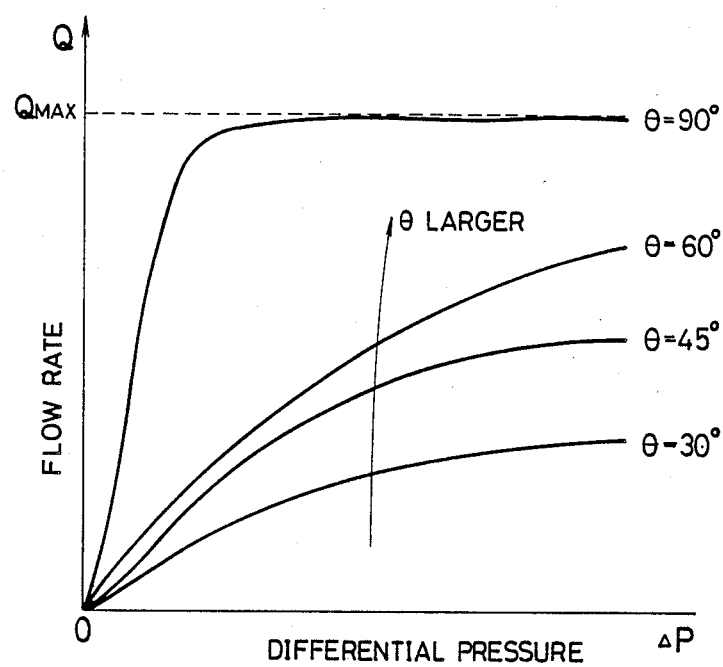
FIGS. 3 to 6 are graphs showing the functions used in the present invention.
Figure 4:
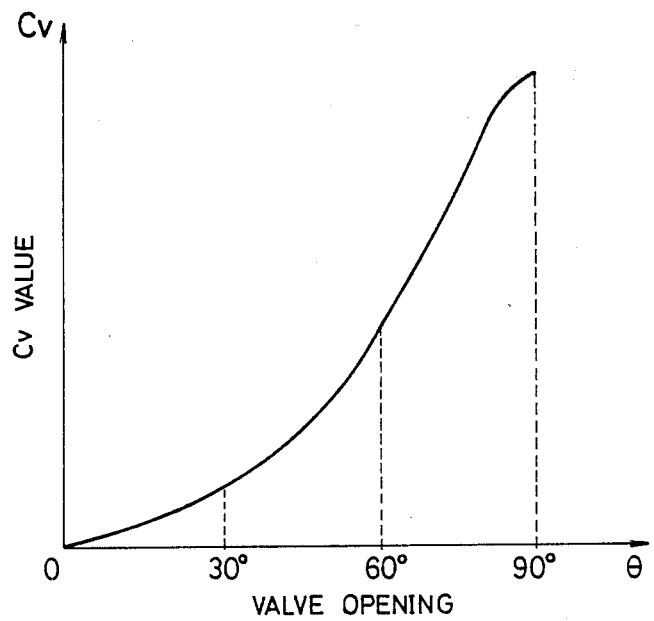

Examples of the relationships expressed by the formulae (11) and (5) are shown in FIGS. 3 and 4, respectively. The illustrated embodiment assumes the relationship expressed by the formula (11). This embodiment also assumes the condition of the following formula (12) as to the relationship between the torque T, the opening $\theta$ and the differential pressure $\Delta P$.

$$T = H(\theta, \Delta P) = \beta Cu \sqrt{\Delta P} \quad (12)$$

where, $$Cu = gg(\theta) \quad (6)$$

In formula (11), $\beta$ represents a correction coefficient employed for the purpose of compensation for a change in the result of measurement caused by a change in factors such as specific gravity, viscosity and temperature of the fluid. Thus, the torque T is in proportion to the root of the differential pressure $\Delta P$, if the opening $\theta$ is fixed, and the proportion constant is $\beta \times Cu$, as can be seen from the formula (12).

Figure 5:
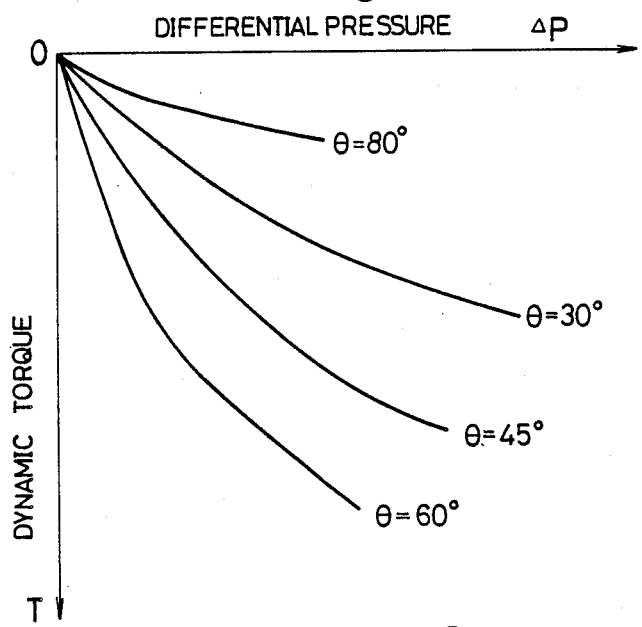
Figure 6:
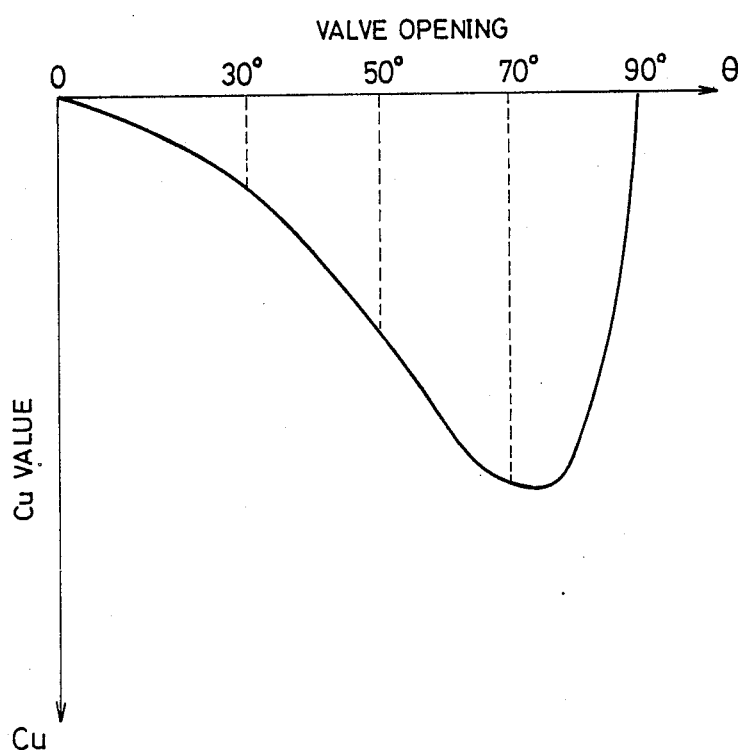

Examples of the relationships expressed by the formulae (12) and (6) are shown in FIGS. 5 and 6, respectively.

The following formula (13) is obtained by eliminating the term of the differential pressure $\Delta P$ from the formulas (11) and (12).

$$Q = G(\theta, T) = \left(\frac{\alpha}{\beta}\right)\left(\frac{Cv}{Cu}\right)T \quad (13)$$

where, $Cv = ff(\theta)$ and $Cu = gg(\theta)$.

The formula (13) means that, if the opening $\theta$ is fixed, the flow rate Q is proportional to the torque T and the proportion constant is $(\alpha/\beta) \times (Cv/Cu)$. It is therefore possible to determine the function $G(\theta, T)$ by determining, through an experiment, values of $ff(\theta)$ and $gg(\theta)$ with varying the opening $\theta$.

An example of the experiment suitably employed for the determination of the values of $ff(\theta)$ and $gg(\theta)$ will be described hereinafter.

A. System and Instruments Used in Experiment

Figure 7:
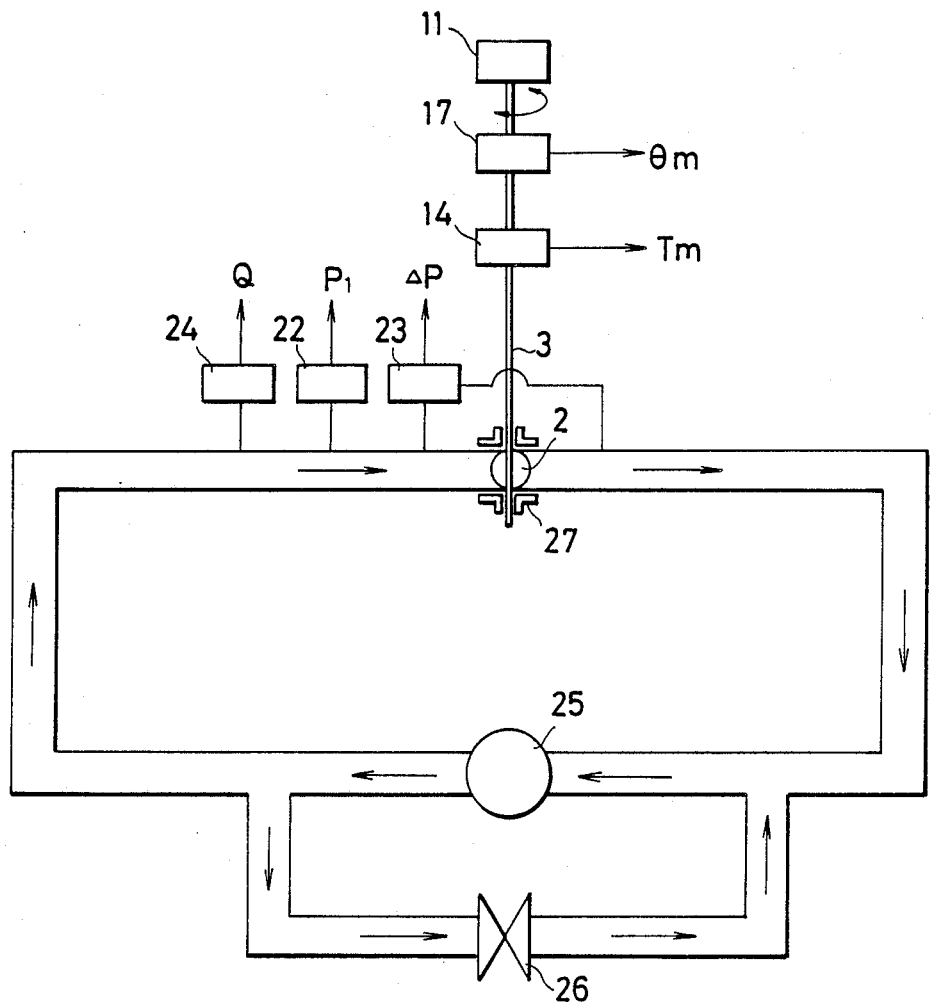
FIG. 7 is schematic diagram of a system used in an experiment conducted on an embodiment of the present invention.

The system and instruments in the following TABLE are employed in the experiment. Bearings 6 are used for supporting the valve shaft 3. The inside diameter of the valve casing 1 is determined to be 2 mm greater than the outside diameter of the valve member 2. FIG. 7 shows the outline of the apparatus. A pressure gauge 22 is capable of measuring the fluid pressure $P_1$ at the upstream side of the butterfly valve 27, while a differential pressure meter 23 measures the pressure difference $\Delta P$ across the butterfly valve 27. The flow rate Q of the fluid flowing through the butterfly valve 27 is measured by an electromagnetic flowmeter 24. The fluid is supplied by a fluid supply device 25 to the butterfly valve 27, as well as to a bypass valve 26 which capable of changing its opening degree for the purpose of setting a desired flow rate through the butterfly valve 27.

TABLE

SYSTEM AND MAJOR INSTRUMENTS USED IN EXPERIMENT

| Names of Instruments | | Principal Specifications |
|---|---|---|
| Butterfly valve 27 | Valve casing 1 | Nominal diameter 150 mm |
| | Valve member 2 | Outside diameter 148 mm Central type |
| | Actuator 11 | Output torque 20 Kg-m |
| Sensor Torque | Strain detector | Sampling frequency 10 KHz Precision 0.5 percent |
| | Torque transducer for 3K | Analog output type |
| Valve opening | Potentiometer | Precision 0.1 percent Analog output |
| Differential pressure | Differential pressure measuring device | Precision 0.1 percent Analog output |
| Flow rate | Electromagnetic flowmeter | Precision 0.02 percent Analog output |
| A/D converter | Consecutive comparison conversion type A/D converter | 12 bit, ±5 V input |
| D/A converter | Current output type D/A converter | 12 bit, 4~20 mA output |
| Control/Recording | 16-bit personal | Memory 1 M |

| TABLE-continued | |
|---|---|
| SYSTEM AND MAJOR INSTRUMENTS USED IN EXPERIMENT | |
| Names of Instruments | Principal Specifications |
| device computer | byte RAM Recording medium: hard disk |

B. Measuring Method

The values of the torque T, differential pressure $\Delta P$, pressure $P_1$ and the flow rate Q are measured for each unit opening $\theta$ of the butterfly valve 27, while controlling the degrees of the opening $\theta$ of the bypass valve 26 and the opening of the butterfly valve 27 by means of a D/A converter. The measurement is conducted under the following conditions: sampling frequency 200 Hz; sample number 200 samples/sec; interval of setting of the opening $\theta$ 0.2 mA; range of setting of the opening $\theta$ 20 mA to 4 mA, interval of setting of the bypass valve opening 1 mA; and range of setting of the bypass valve opening 20 mA to 10 mA.

Water maintained at a normal temperature is used as the fluid. The measurement is executed by sequentially executing the following steps (a) to (g).

(a) To set the valve opening of the bypass valve 26
(b) To set the opening $\theta$ of the butterfly valve 27
(c) To measure the torque T, the differential pressure $\Delta P$, the flow rate Q, the pressure $P_1$ and the opening $\theta$ of the butterfly valve
(d) To record the measured data
(e) To repeat steps (b) to (d) 80 times
(f) To execute the process from the step (a) after 80 executions of steps (b) to (d)
(g) To repeat step (a) for a predetermined time, thus completing the whole process.

C. Results of Experiment

Figure 8:
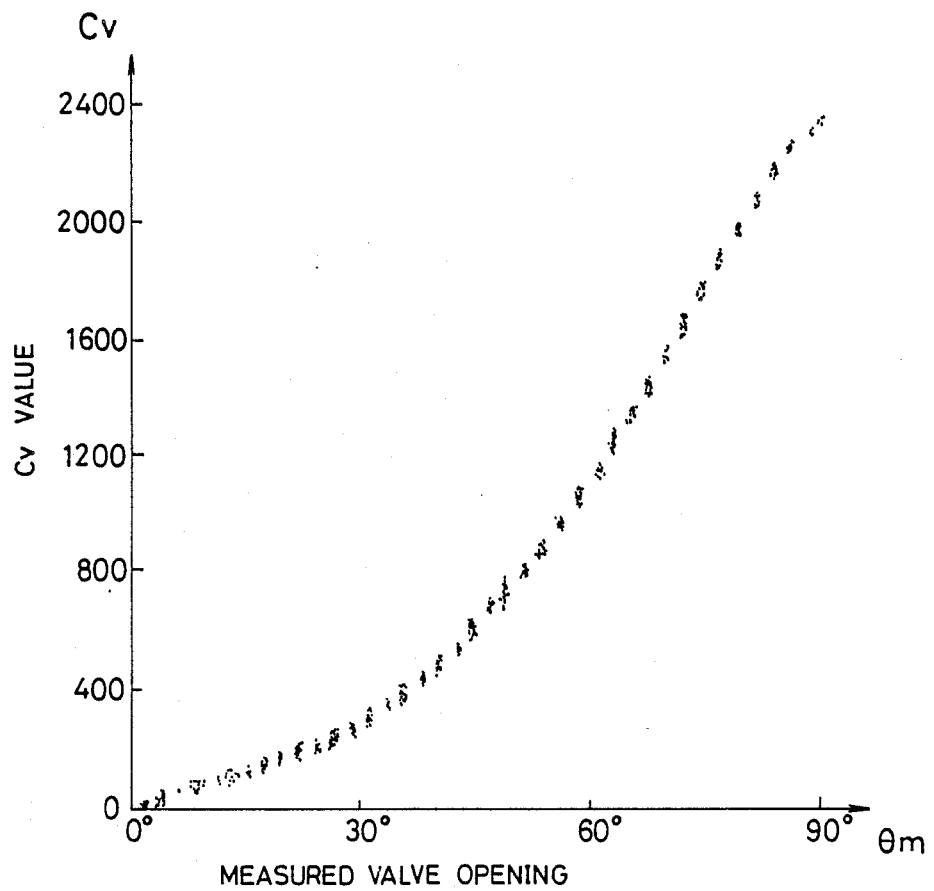
FIGS. 8 and 9 are graphs showing the result of the experiment.
Figure 9:
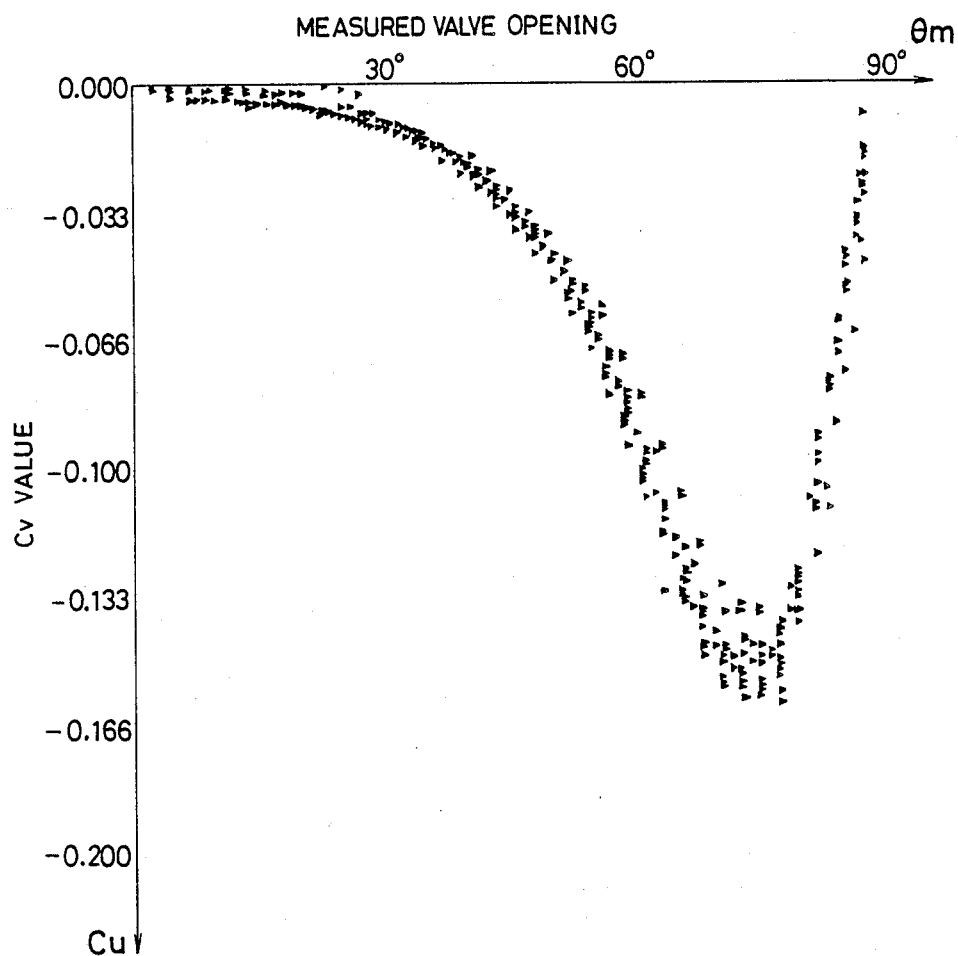
Figure 10:
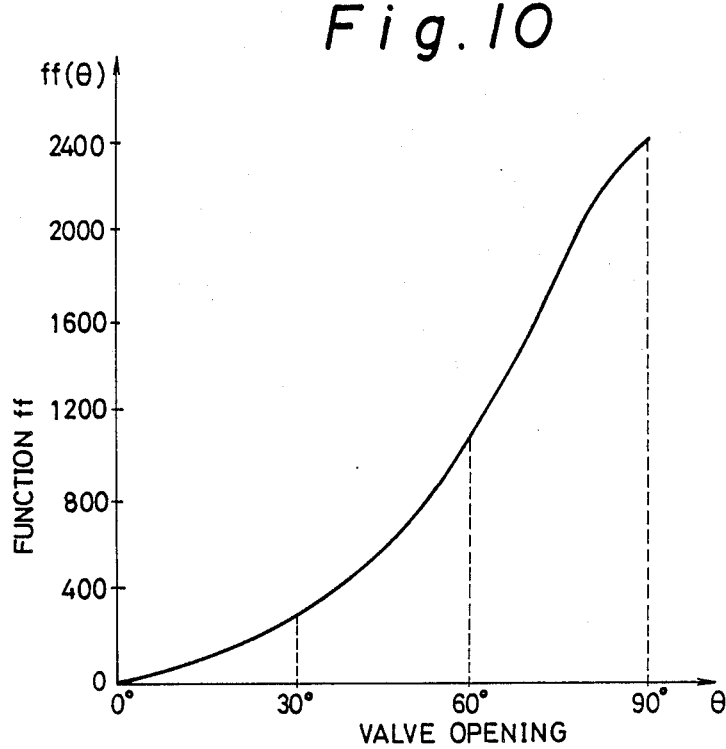
FIGS. 10 and 11 are graphs showing the functions derived from the results of experiment.
Figure 11:
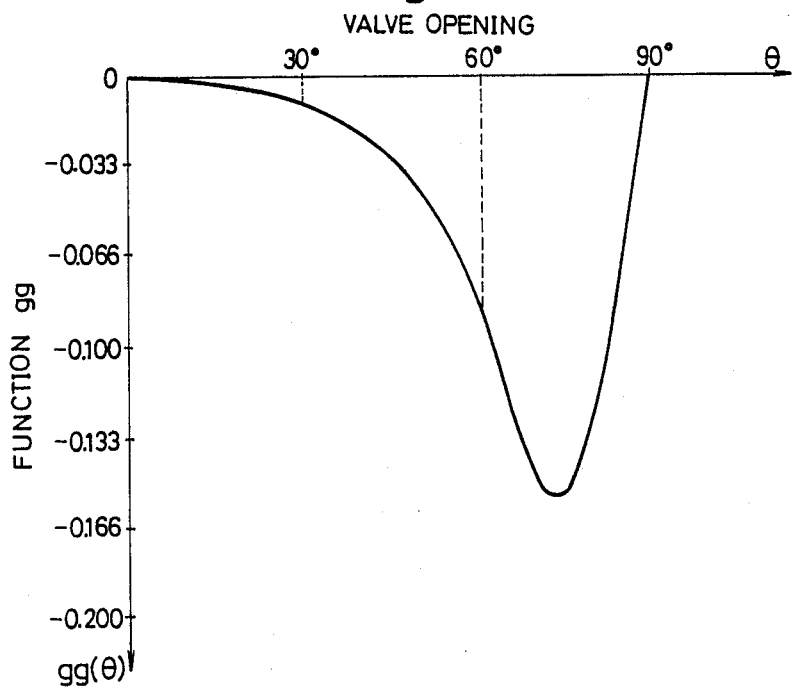

The Cv and Cu values in relation to the measured opening $\theta m$, obtained as results of the experiment, are shown in FIGS. 8 and 9, respectively. In these Figures, discrete dots represent the values obtained through the experiment. In this embodiment, the function $ff(\theta)$ of a formula (14) and the function $gg(\theta)$ of a formula (15) are determined, respectively, by applying four-degree approximate expression and five-degree approximate expression, respectively, to the values of these discrete dots.

$$ff(\theta) = \theta^4 \times A_4 + \theta^3 \times A_3 + \theta^2 \times A_2 + \theta \times A_1 + A_0 \tag{14}$$

where,
$A_4$: $-9.146 \times 10^{-5}$
$A_3$: $1.531 \times 10^{-2}$
$A_2$: $-4.746 \times 10^{-1}$
$A_1$: $1.242 \times 10$
$A_0$: $0.000$ $$gg(\theta) = \theta^5 \times B_5 + \theta^4 \times B_4 + \theta^3 \times B_3 + \theta^2 \times B_2 + \theta \times B_1 + B_0 \tag{15}$$

where,
$B_5$: $8.540 \times 10^{-10}$
$B_4$: $-1.672 \times 10^{-7}$
$B_3$: $1.125 \times 10^{-5}$
$B_2$: $-3.572 \times 10^{-4}$
$B_1$: $4.919 \times 10^{-3}$
$B_0$: $-2.588 \times 10^{-2}$ The functions $ff(\theta)$ and $gg(\theta)$ are respectively shown in FIGS. 10 and 11.

Thus, in the illustrated embodiment, the Cv and Cu values are determined as follows for any opening $\theta$ as follows.

$$Cv = ff(\theta) \tag{5}$$

$$Cu = gg(\theta) \tag{6}$$

Therefore, the flow rate Q can be computed from the measured opening $\theta$ and the measured torque T from the formula (13), without requiring measurement of the differential pressure $\Delta P$, insofar as this butterfly valve 27 or a butterfly valve of the same design as this valve is concerned.

Although the four-degree approximate expression and the five-degree approximate expression are used in the described embodiment, these use of these approximate expressions is not exclusive. For instance, the following formulae (16) and (17), which are approximate expressions of order n, can be used in place of the formulae (14) and (15).

$$ff(\theta) = \sum_{j=0}^{n} \theta^j A_j \tag{16}$$

where $A_j$ represents a coefficient of an order j $$gg(\theta) = \sum_{j=0}^{n} \theta^j B_j \tag{17}$$

where $B_j$ represents a coefficient of an order j

It is also possible to use known approximate expressions in place of the formulae (16) and (17). The conditions of the experiment such as the sampling frequency, interval of setting of the opening $\theta$ and/or the interval of setting of the bypass valve opening are preferably varied in accordance with the demanded measuring precision.

Although the conditions of the formulae (11) and (12) are assumed in this embodiment, such assumption is not essential. Namely, the function $F(\theta, \Delta P)$ and $H(\theta, \Delta P)$ may be determined in accordance with an experimental formula from the flow rate Q, the opening $\theta$, the differential pressure $\Delta P$ and the torque T. It is to be noted that the function $G(\theta, T)$ may be determined as an experimental formula directly from the results of the experiment, although in the described embodiment the function $G(\theta, T)$ is determined after the determination of the functions $ff(\theta)$ and $gg(\theta)$.

It is also possible to form a chart showing the values of the flow rate Q in relation to the opening $\theta$ and the torque T from the experiment result, with the portions between discrete dots interpolated with a suitable interpolation formula, so that the flow rate Q can be read on the chart in accordance with the measured values of the opening $\theta$ and the torque T.

All these methods for determining the flow rate Q can be performed quickly by making use of a computer.

As has been described, the butterfly valve of the present invention has a valve opening detection means capable of detecting the degree of the valve opening of the butterfly valve and a torque detection means capable of detecting the dynamic torque produced by the flow of the fluid acting on the valve member around the axis of the valve shaft. Therefore, by determining beforehand a relationship between the flow rate and the values of the valve opening and the dynamic torque peculiar to the butterfly valve, it is possible to determine the flow rate from the measured values of the valve opening and the dynamic torque. Thus, in the butterfly valve of the present invention, the valve member has not only a function for restricting the flow of the fluid but also a function for sensing the flow rate. It is therefore possible to directly measure the flow rate of the fluid passing through the butterfly valve without error which may otherwise be caused due to a positional difference and time delay when the flow rate is measured by a separate flowmeter. The higher precision of measurement of the flow rate thus attained ensures higher speed and precision of the control of the flow rate conducted in accordance with the flow rate information. The flow rate measurement which does not rely upon conductivity of the fluid enables the butterfly valve to be used in controlling the flow rate of a non-conductive fluid such as an oil. In addition, the control of the flow rate of the fluid can be done without disposing any flowmeter in the flow passage other than the butterfly valve.

Many widely different embodiments of the present invention may be constructed without departing from the spirit and scope of the present invention. It should be understood that the present invention is not limited to the specific embodiments described in this specification, except as defined in the appended claims.

What is claimed is:

1. A butterfly valve having as one function the measurement of a flow rate of a fluid flowing through said butterfly valve, comprising;
    a main body,
    a valve shaft fixed rotatably to said main body,
    a valve member fixed to said valve shaft and mounted rotatably in said main body,
    a valve opening detection means for detecting a valve opening of said butterfly valve,
    a torque detection means for detecting a dynamic torque applied to said valve member around said valve shaft by said fluid, and
    a flow rate computation means for computing said flow rate as a predetermined function of said valve opening and said dynamic torque.

2. A butterfly valve according to claim 1, further comprising an actuator connected to said valve shaft for rotating said valve member.

3. A butterfly valve according to claim 2, in which said actuator is selected from a group consisting of an electric actuator, a pneumatic actuator, a diaphragm-type actuator and a solenoid-type actuator.

4. A butterfly valve according to claim 2, further comprising a control means at which a desired flow rate can be externally set and which instructs said actuator to rotate said valve member such that said computed flow rate approaches said desired flow rate.

5. A butterfly valve according to claim 4, in which said desired flow rate can be set to said control means from a remote place by a remote operation means through a tele-communication means.

6. A butterfly valve according to claim 1, in which said torque detection means includes a strain detector provided to said valve shaft.

7. A butterfly valve according to claim 1, in which said valve opening detection means includes an angle sensor connected to said valve shaft.

8. A butterfly valve according to claim 7, in which said angle sensor comprises a potentiometer or a rotary encoder connected to said valve shaft.

9. A butterfly valve according to claim 1, characterized in that said butterfly valve is a central-type or an eccentric-type.

10. A method of measuring a flow rate of a fluid flowing through a butterfly valve, comprising the steps of;
    detecting a valve opening of said butterfly valve,
    detecting a dynamic torque applied to a valve member of said butterfly valve around a valve shaft of said butterfly valve by said fluid, and
    determining said flow rate as a function of said detected valve opening and said detected dynamic torque.

11. A method according to claim 10, in which said function is estimated by obtaining a relationship between said flow rate and said valve opening and said dynamic torque through an experiment.

12. A method according to claim 10, in which said function is estimated on an assumption that said flow rate is proportional to said dynamic torque when said valve opening is unchanged.

13. A method according to claim 10, in which said flow rate is determined on a chart which shows a relationship between said flow rate and said valve opening and said dynamic torque.

14. A method according to claim 13, in which said relationship is obtained through an experiment.

15. A method according to claim 10, in which determination of said flow rate is executed by a computer.

16. A method of controlling a flow rate of a fluid flowing through a butterfly valve, comprising the steps of:
    detecting a valve opening of said butterfly valve,
    detecting a dynamic torque applied to a valve member of said butterfly valve around a valve shaft of said butterfly valve by said fluid,
    determining said flow rate as a function of said detected valve opening and said detected dynamic torque,
    setting a desired flow rate, and
    changing said valve opening such that said determined flow rate approaches said desired flow rate.

* * * * *